Patented Dec. 1, 1942

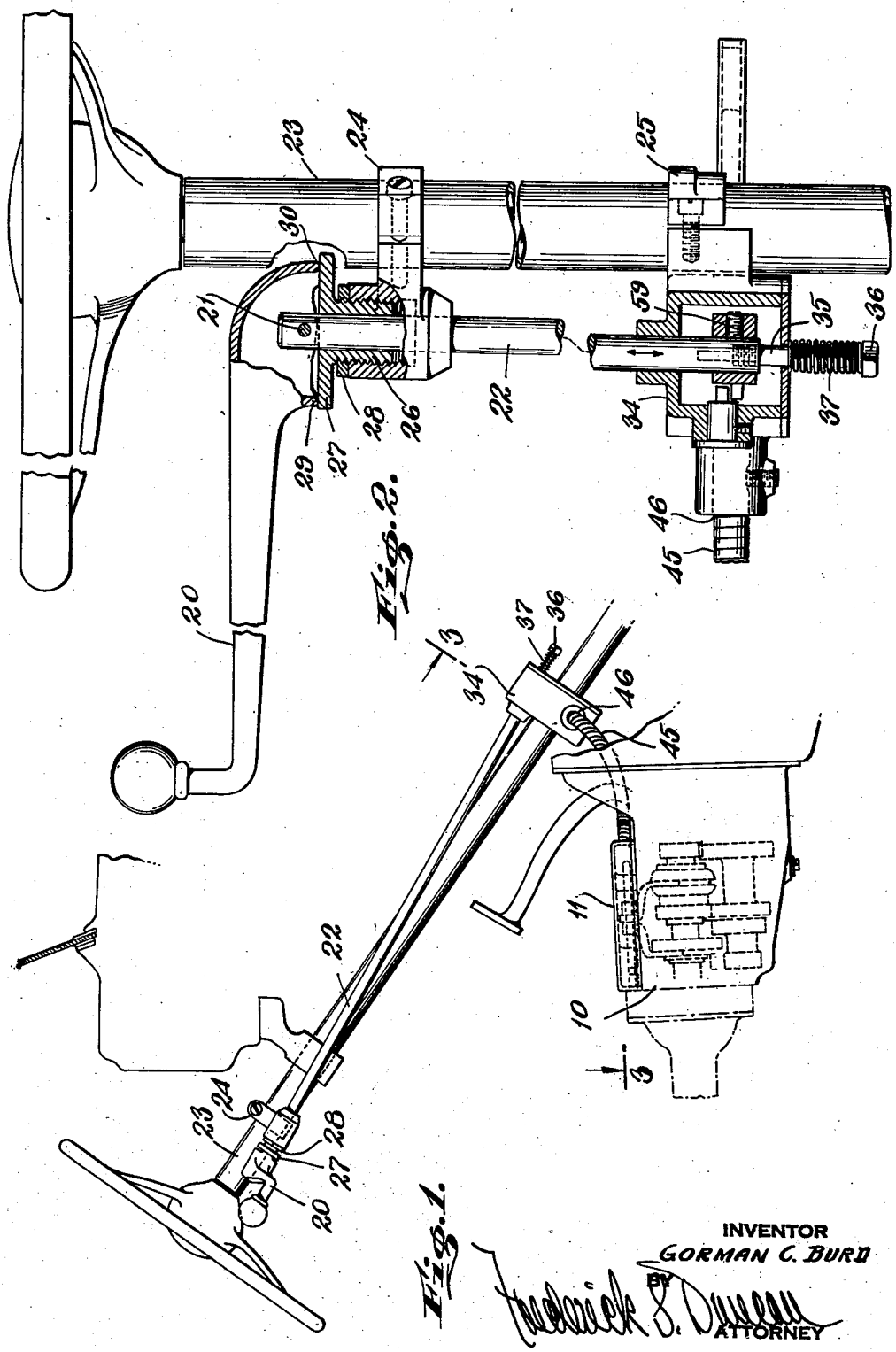

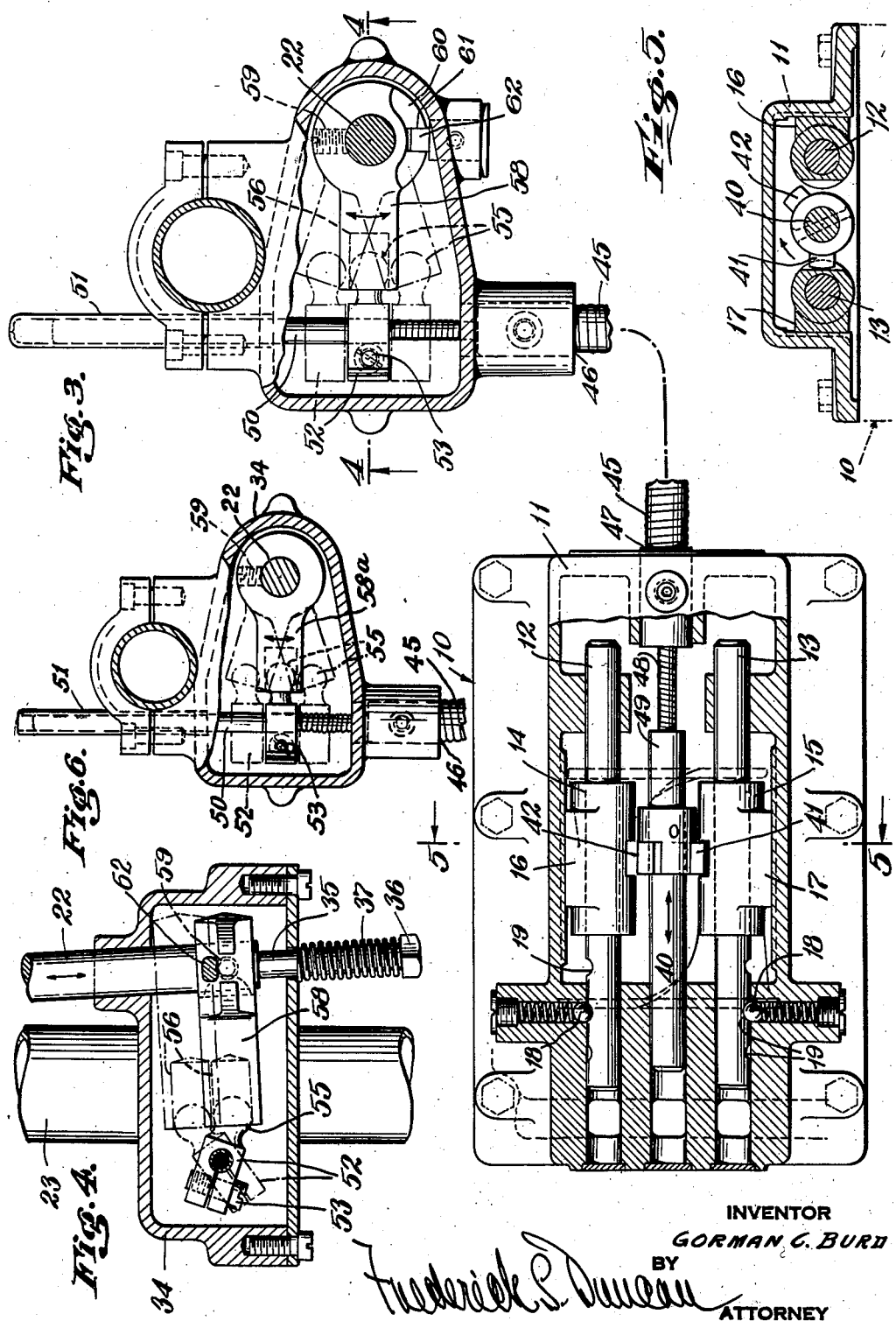

2,303,787

UNITED STATES PATENT OFFICE 2,303,787

SPEED CHANGING MECHANISM

Gorman C. Burd, Adrian, Mich., assignor to American Chain & Cable Company, Inc., a corporation of New York Application October 19, 1939, Serial No. 300,186
In Great Britain June 1, 1939

6 Claims. (Cl. 74—473)

This invention relates to speed changing mechanism for automobiles or other vehicles and relates more particularly to means for operating the gear selecting and gear shifting mechanism of a conventional form of shifting gear type transmission by means of control means such as a lever located at a distant point.

The main object of this invention is the provision of improved mechanism of this type for effecting gear selecting and gear shifting operations.

Another object of the invention is the provision of improved means for normally preselecting gears.

Another object of this invention is to provide improved mechanism for manually preselecting gears before meshed gears are disengaged as in the case where it is intended to shift from one gear to another.

Another object of this invention is to employ an improved connecting means between a gear shifting lever and gear selecting and gear shifting mechanism of the type which is flexible and which effects gear shifting by its longitudinal movement and gear selecting by its rotational movement, which is substantially non-yieldable in a longitudinal direction but yieldable to torsional strains when a rotative force is applied to one end thereof greater than that required to select gears.

Another object of this invention is the provision of an improved connecting means which is readily flexible to yield to relative movements between the support of the operating lever and a cushioned gear shift housing.

Further objects of this invention consist in the provision of a connecting means which is simple in construction, inexpensive to manufacture and which may be made of uniform lengths regardless of variations in distance between the parts connected on different makes of cars.

Other objects of this invention appear from the following description taken in connection with the drawings, in which—

Fig. 1 is a side elevational view of my invention as applied to gear shifting mechanism of any standard type and in which the operating lever of my invention is supported on the steering column.

Fig. 2 is a front elevation partly in section of a part of the connections between the operating lever and the gear shift mechanism disclosing the manner in which the lever and connections are supported on the steering column.

Fig. 3 is a horizontal cross sectional view through a portion of the lower bracket on the steering column and through a portion of the cover on the gear box taken substantially on the line 3—3 Fig. 1.

Fig. 4 is a vertical sectional view through the lower bracket on the steering column on the line 4—4 Fig. 3;

Fig. 5 is a transverse sectional view through the cover of the gear box and the gear selecting and gear shifting spindle and gear shifting rails on the line 5—5 Fig. 4; and Fig. 6 is a view corresponding to the right hand portion of Fig. 3 showing a modification.

For the purpose of disclosure, I have illustrated my invention as applied to a conventional form of gear shift mechanism housed within a gear box 10 provided with a cover 11 in which are slidably supported gear shifting rails 12 and 13 to which are secured hubs 14 and 15 of shifting forks not disclosed, the fork connected to the hub 15 upon forward movement shifting into low and upon rearward movement into reverse and the fork connected to the hub 14 upon forward movement shifting into high and upon rearward movement shifting into second. It is obvious, of course, that the effect of the movement of these forks may be reversed, that is, the fork associated with the hub 14 may control the mechanism to shift into low or reverse and the fork associated with the hub 15 may cause the mechanism to shift into second or high depending upon whether a normal preselection of reverse and low are desired or a normal preselection of high and second are desired. The hubs 14 and 15 may be provided with faces 16 and 17 slidably engaging the side walls of the cover of the gear box to prevent rocking movement of the forks. The shifting rails 12 and 13 may be held in either neutral or shifted positions by spring pressed balls 18 engaging in notches 19 in the rails for this purpose as is well understood. Any suitable means may be provided for a simultaneous shifting of the forks.

As disclosed in Figs. 1 and 2, I provide a gear shift crank arm 20 pivoted at 21 to the upper end of a shaft 22 supported on the steering column 23 by means of brackets 24 and 25 clamped to the steering column in a well known manner as indicated. The upper end of the rod 22 may have a bearing in the lower end of a cup-shaped member forming a part of the bracket 24 and also in a threaded plug 26 provided with a flange 27 constituting a fulcrum for the crank arm 20 as indicated at 29 and 30, by means of which the shaft 22 may be raised by moving the crank arm 20 either upwardly or downwardly. Other forms of connections may be used between the crank arm 20 and the shaft 22 and the bracket 24 to provide for rotating and shifting the shaft 22.

Formed on the lower bracket 25 is a housing 34 into which the lower end of the rod 22 extends and for purposes later described the lower end of the rod 22 may be provided with an integral or attached extension 35 extending through the lower wall of the housing 34 and provided at its lower end with an abutment 36 between which and the lower wall of the housing may be a spring 37 which will normally hold the crank arm in the position shown in Fig. 2.

The gear shift mechanism includes a spindle 40 rotatably and shiftably mounted in the cover 11 of the gear box and is provided with lugs 41 and 42 adapted to be rocked into engagement with notches in the hubs 14 and 15 of the forks for the purpose of transmitting gear shifting movement from the spindle to the forks. The construction is such that the spindle can be rocked only when both of the forks are in neutral position.

The connecting means for transmitting movement from the shaft 22 to the spindle 40 comprises a Bowden wire construction which includes an outer flexible coiled wire casing 45 provided with end fittings 46 and 47 secured respectively to the housing 34 on the steering column and the cover 11 of the gear shift housing by bolts or the like as indicated. Operating within the housing 45 is a cable 48 which may be of the construction disclosed in the patent to Kuney 1,970,702, August 21, 1934, to transmit rotational forces as well as longitudinal forces. One end of the cable is provided with a fitting 49 suitably secured to the spindle 40, and the other end with a fitting 50 slidably and rotatably mounted in a tubular member 51 secured to the housing 34. For purposes later set forth, I employ a cable constructed and treated in accordance with the disclosure in the Kuney patent so as to be substantially inextensible and incompressible lengthwise but resiliently yieldable to rotational forces greater than those required to rotate the gear selecting spindle.

Clamped upon the fitting 50 by means of a bolt 53 is an arm 52 provided with a ball 55 which engages a cylindrical socket 56 in the end of an arm 58 secured to the shaft 22 by means of a set screw 59. The hub of the arm 58 may be provided with a rib 60 interrupted at 61 so that the rib may be passed from one side to the other of a pin 62 suitably secured in the housing 34. The relation is such that when the pin is in the opening in the flange the shaft 22 will be in neutral position both in respect to gear selection and gear shifting. When the rib is on one side of the pin 62 for example on the lower side of the pin, the low and reverse or the high and second gears are selected for operation as predetermined and when the rib is at the upper side of the pin as when the shaft 22 is raised the other pair of gears will be selected for shifting operation.

The spring 37 before referred to operates to push the shaft 22 down and hold the crank arm 20 in normal position horizontally and to rotate the spindle 40 to bring its selecting lug 41 into the slot in the hub 15 of the low and reverse gear shifting fork. It is possible to shift into either low or reverse gears without making a selection. When it is desired to select the other pair of gears such as the high and second the crank arm 20 is either moved downwardly or upwardly in the construction disclosed which rotates the spindle 40 so as to engage the selecting lug 42 with the slot in the hub 14 on which the other shifting fork is carried.

The spring 37 may be omitted especially in those constructions in which the normal position of the mechanism is the neutral position both as to selection and as to gear shifting, as for example, in well known constructions in which the movement of the lever or crank arm 20 from the normal position in one direction will move the shaft in one direction and movement of the lever in the other direction will move the shaft in the opposite direction, each movement effecting gear selection. Such normal position could be maintained by any suitable means and in the construction disclosed may be maintained by interposing a spring between the lower end of the hub of the arm 58 and the bottom of the casing to cooperate with a spring such as 37 to hold the shaft in an intermediate vertical position.

If desired the rib 60 as indicated by the showing of the hub of the arm 58a and pin 62 may be omitted or the pin 62 may be withdrawn from cooperation with the arm 58 in Fig. 3, so that the crank 20, when it is desired to shift from either high or second into either low or reverse, may be moved to effect gear selection at any point in its gear shifting movement before reaching neutral position such movement causing the cable to be torsionally twisted and which torsional twist when the lug 42 reaches the neutral position will rotate the spindle 40 to effect gear selection. It is obvious, of course, that the selection of the other pair of gears will be made automatically. It will, therefore, not be necessary to follow an H-path in selecting and shifting gears as in the usual construction and in the construction herein disclosed when the pin 62 is employed for the purpose stated.

By means of the construction disclosed the operative connection between the gear shifting lever and the spindle in the gear box has been considerably simplified and by arranging connections operating on the cable in such a manner that gear selection is effected by rotation of the cable rather than longitudinal movement of the cable it is possible to make use of rotational distortion of the cable to preselect gears and to make use of the longitudinal inextensible feature of the cable for shifting the gears which as is well understood requires considerably more force than that required for selecting gears.

While I have described the preferred form of my invention it is obvious, of course, that changes may be made within the principles of this invention and it is to be understood that I reserve the right to all such changes as fall within the principles of the invention and the scope of the appended claims.

I claim:

1. The combination with a gear selecting and gear shifting spindle rotatably mounted for gear selection and slidably mounted for gear shifting, a cable operatively connected to said spindle for rotating said spindle by rotation of said cable, said cable being torsionally yieldable and said spindle being rotatable for selecting gears only when in its neutral position and means normally torsioning said cable in a direction to rotate said spindle and effect selection of certain of said gears when said spindle is moved into neutral position.

2. The combination with a gear selecting and gear shifting spindle rotatably mounted for gear selection and slidably mounted for gear shifting, a cable operatively connected to said spindle for rotating said spindle by rotation of said cable, said cable being torsionally yieldable and said spindle being rotatable for selecting gears only when in its neutral position and means normally torsioning said cable in a direction to effect selection of certain of said gears when said spindle is moved into neutral position, and a manipulative lever normally held in one position by said torsioning means and connected to said cable for torsioning said cable in the opposite direction upon movement of said manipulating lever.

3. The combination with a gear selecting and gear shifting spindle rotatively mounted for gear selection and slidably mounted for gear shifting, means for rotating and sliding said spindle comprising a slidably and rotatably mounted rod, a torsionally yieldable cable connected to said spindle, means connecting said rod to said cable for rotating said cable and spindle upon sliding movement of said rod and for sliding said cable and spindle upon rotative movement of said rod, means associated with said last mentioned means for compelling an H-movement of said rod for gear selection and means associated with said rod constantly urging said rod into one of its extreme positions and operating to twist said cable when said spindle is on one side of its neutral position, the twist torsion in said cable operating to effect a gear selection when said spindle is moved into its neutral position.

4. The combination with a gear selecting and gear shifting spindle rotatably mounted for gear selection and slidably mounted for gear shifting, means for rotating and sliding said spindle comprising a rod, a steering column, means for supporting said rod on said column for sliding movement longitudinally of said column and rotating movement about its axis, means connecting the lower end of said rod to said spindle for rotating said spindle upon sliding movement of said rod and for sliding said spindle upon rotating movement of said rod, a manipulative lever associated with the upper end of said rod and with said steering column for moving said rod to its limit of movement in one direction and spring means for moving said rod to its limit of movement in the other direction, said movements of said rod effecting selection of different gears.

5. The combination with a gear selecting and gear shifting spindle rotatably mounted for gear selection and slidably mounted for gear shifting, an operating lever rotatably mounted for gear shifting purposes and pivotally supported for movements at right angles thereto for gear selection purposes, means connecting said operating lever to said spindle for positively transmitting gear shifting movements of said lever to said spindle and for yieldably transmitting gear selecting movements of said lever to said spindle, the construction being such that the operating lever may be moved in either of its direction of movements in any of its positions successively or may be moved in diagonal direction from any of its positions.

6. The combination with a gear selecting and gear shifting spindle rotatably mounted for gear selection and slidably mounted for gear shifting, a torsionally yieldable operating cable connected at one end co-axially to said spindle, means connected to the other end of said cable for rotating and sliding said cable, and means for normally urging said other end of said cable into one of its rotated positions for torsioning said cable to cause the spindle to move into one of its rotated positions after it has been moved into its gear selecting position for preselecting predetermined gears.

GORMAN C. BURD.